United States Patent [19]

Ishida et al.

[11] Patent Number: 5,066,547
[45] Date of Patent: * Nov. 19, 1991

[54] METAL AND CERAMIC HEAT-CONNECTED BODY

[75] Inventors: Noboru Ishida; Masaya Ito; Mitsuyoshi Kawamura, all of Nagoya, Japan

[73] Assignee: NGK Spark Plug Co., Ltd., Nagoya, Japan

[*] Notice: The portion of the term of this patent subsequent to Oct. 18, 2005 has been disclaimed.

[21] Appl. No.: 385,991

[22] Filed: Jul. 24, 1989

Related U.S. Application Data

[63] Continuation of Ser. No. 39,602, Feb. 18, 1986, abandoned.

[30] Foreign Application Priority Data

Feb. 18, 1985 [JP] Japan .................................. 60-29685

[51] Int. Cl.$^5$ ...................... B32B 15/04; F04D 29/38
[52] U.S. Cl. .................................. 428/627; 428/632; 428/685; 428/450; 428/469; 416/241 B; 148/144; 228/903

[58] Field of Search ............... 428/627, 632, 680, 684, 428/685, 450, 457, 469; 228/122, 903; 148/144; 420/60, 61; 416/241 B

[56] References Cited

U.S. PATENT DOCUMENTS

| | | | |
|---|---|---|---|
| 4,335,998 | 6/1982 | Siebels | 416/241 B |
| 4,778,345 | 10/1988 | Ito et al. | 416/241 B |
| 4,810,585 | 3/1989 | Oda et al. | 428/469 |

Primary Examiner—R. Dean
Assistant Examiner—George Wyszomierski
Attorney, Agent, or Firm—Fish & Richardson

[57] ABSTRACT

In heat-connection between metal and ceramic, martensite stainless steel or martensite heat-resistant steel which can be hardened a gas or vacuum after having been heated beyond the quenching temperature thereof are used as metal. The heat connection is brazing or shrinkage fit at 800° C. or more. Stress strain caused by a difference in thermal expansion coefficient between the two can be reduced. Further, since the metal can be connected to ceramic while hardening the metal, man-hour can be reduced markedly.

10 Claims, 2 Drawing Sheets

METAL AND CERAMIC HEAT-CONNECTED BODY

This application is a continuation of U.S. application Ser. No. 039,602, filed Feb. 18, 1986, now abandoned.

BACKGROUND OF THE INVENTION

1. Field of the Invention

The present invention relates to a metal and ceramic heat-connected body and more specifically to a body heat-connected of a ceramic and a highly hard metal (as for a shaft having a sliding portion), which is usable as a rocker arm for an engine including a ceramic tip and a metal arm, and a turbine rotor including a ceramic blade wheel and a metal shaft.

2. Definition

The term "heat-connect" herein generally denotes that two members are connected or jointed by application of heat at 800° C. or higher.

3. Description of the Prior Art

Ceramic material is excellent in heat and corrosion resistance and samall in specific gravity. Therefore, utilization of ceramic material is now being studied for rocker arm tips, turbine blades, auxiliary chambers of internal combustion engines, etc. However, it is desirable to use ceramics in combination with metal because of its brittleness. By the way, brazing, pressure fit, shrinkage fit, expansion fit, etc. are well known as methods of connecting or jointing ceramics and metal. However, in the case where ceramic components are small in size as in rocker arms or a strong connecting strength is required between the two at high temperatures as in turbine rotors, high-temperature heat-connection method such as brazing or shrinkage fit is usually adopted.

SUMMARY OF THE DISCLOSURE

In high-temperature heat-connection between ceramic and metal, since metal is readily annealed through the heat-connection it is impossible to directly use the connected metal per se as sliding components for products. Accordingly, it is usually necessary to harden the metal portion through a heat treatment process after the metal has been connected with ceramics. In this process, the heat treatment temperature should, of course, be by about 50° C. lower than the connecting temperature, thus raising a problem in that it is impossible to obtain sufficient metal hardness. On the other hand, when the treatment temperature is set to a sufficiently high temperature, there exists another problem such that cracks may be produced in ceramics because of internal stress caused by thermal strain after the heat treatment, and further, at the worst, ceramics may be broken, during a subsequent oil or water quenching process.

In addition, since there exists a big difference in the thermal expansion coefficient between metal and ceramics, stress strain usually remains at the connected portion due to the coefficient difference between the two, thus deteriorating durability at the connected portion of the body.

Accordingly, an object of the present invention is to provide a novel body in which highly hard metal and ceramics are strongly heat-connected to each other while solving the above-mentioned problems involved in the prior art metal and ceramic heat-connected body.

In the present invention, martensite stainless steels or martensite heat-resistant steels, which can be hardened within a gas or vacuum after having been heated above the quench hardening temperature, are used as metal to be heat-connected to ceramics. Here, heat-connection implies all the methods such as brazing, shrinkage fit and the like connecting or jointing techniques in which at least the connected end of metal is connected to ceramics at a high temperature of 800° C. or higher. It is preferred that the martensite phase constitutes a major phase in the hardened metal, e.g., at least 50 vol % (more preferably 80 vol %) of the entire metal.

In the metal and ceramic heat-connected body according to the present invention, the metal is high in hardness and additionally the heat-connected body is high in connection strength. Further, since it is possible to connect metal with ceramic while hardening the metal, man-hour can be reduced markedly.

The basic concept of the present invention is based on the following points:

(1) connecting temperature of metal and ceramic composit articles is high, because the connected portion thereof is usually exposed to a high temperature in use;

(2) martensite stainless steel and martensite type heat-resistant steel are typically by about 0.5% expanded due to martensite transformation at the cooling upon quench hardening process; and (3) there exist some metals which can be hardened even by cooling in a gas or vacuum atmosphere among various martensite stainless steels and martensite heat-resistant steels.

In more detail, since the heat-connecting temperature is equivalent or higher than the quench hardening temperature (generally about 700° to about 1100° C.) of the metal concerned and further the heat-connected metal can be hardened within a gas or vacuum atmosphere, the metal to be connected is simultaneously heated above the quench hardening temperature and then cooled for hardening the metal during the same heating and cooling processes for connecting the metal with ceramics. Further, since the connected metal is one of martensite stainless steels or martensite heat-resistant steels and the metal is by at least 0.02% (preferably at least 0.1%, and most preferably, at least 0.5%) expanded due to martensite transformation during the cooling process, it is possible to reduce stress strain caused by the difference in thermal expansion coefficients between the metal and ceramics at the connected portion thereof. As the metals to be used for the present invention, it is possible to give an example of martensite heat-resistant steel such as SUH-616 steel, SUH-600 steel, etc. which includes 0.02 to 3 wt % of at least one element selected from Mo, W and V, or of martensite stainless steel such as SUS-440, SUS-420, SUS-403, AISI-618, etc. which includes a relatively high content of carbon e.g., about 0.1–about 1.5 wt %. In those metals, the hardness HRC becomes sufficiently high so as to assure excellent wear resistance, i.e., 40 or more (preferably 45 or more, most preferably 50 or more) through the heat-connection of the present invention. However, without being limited to those metals hereinabove specifically mentioned, all the martensite stainless steels or martensite heat-resistant steels which can be quench hardened within the predetermined temperature range are applicable to the present invention. The above temperature range is preliminarily determined by measuring a range within which atmosphere for heat-connection is controllable. Further, the metal applied to the present invention is not limited to the examplified additive elements or the amounts thereof.

The quench hardening can be effected during the cooling procedure immediately following the heat-connection at the high temperature defined to each of the metal connected. A suitable cooling rate for respective metal connected should be maintained during the cooling procedure, e.g., at least 10° C./min (preferably at least 30° C./min) during the temperature range where the transformation from austenite to martensite (herein referred to as martensite transformation) occurs. The martensite transformation temperature range depends greatly upon the type of steel and the cooling rate itself, thus such range should be determined by a preliminary testing. The quench hardening temperature range of the metal is defined so as to provide the hardened HRC of at least 40 which is sufficient to provide excellent wear resistance. Accordingly the quench hardening temperatures of the present invention for the respective metals may be slightly lower than those as specified in the known standard quench hardening temperature (e.g., appearing in JIS or "Kinzoku [=Metal] Data Book", 1974 edited by Japan Institute of Metallurgy, page 117, Table 5.2 2, a copy thereof will be submitted for reference). In the present invention the heating temperature for the quench hardening may be as follows:

| metal | present invention | standard quenching |
|---|---|---|
| SUS-420 J2 | ≧880° C. air* | 1000–1050° C. oil** |
| SUS-440 | ≧900° C. air | 1010–1070° C. oil |
| SUH-600 | ≧900° C. air | 1020–1070° C. oil |
| SUH-616 | ≧900° C. air | 1020–1070° C. oil |

*air cooling
**oil quenching

It should be noted that combination of brazing and shrinkage fit may be employed as shown in FIG. 3A and FIG. 3B, wherein the numerals 3 and 6 indicate brazing and shrinkage fit, respectively, and the numeral 7 indicates clearance. Heating can be made at one time for both while heating in two times may be effected, too. This combination of heat-connection provides a more stable and secure connection.

The ceramics applicable in the present invention embraces heat resistant ceramics such as silicon nitride ($Si_3N_4$, thermal expansion coefficient $\alpha$ of $3.0 \times 10^{-6}$/° C. within a temperature range between room temperature R. T. and 1000° C.), silicon carbide (SiC $\alpha = 4.6 \times 10^{-6}$/° C. between R. T. and 1200° C.), and alumina ($\alpha = 8.0 \times 10^{-6}$/° C. between R. T. and 900° C.). Other ceramics having similar properties may be employed in the present invention.

Brazing joint may be applied as the heat-connection wherein brazes should have a brazing temperature of at least 800° C. (preferably not exceeding 1200° C., more preferably 900°–1170° C.). The shirinkage fit temperature of the metal should be at least 800° C. (preferably not exceeding 1200° C., more preferably 900°–1170° C.). In summary the heat-connection should be effected at a temperature within the temperature range of 800°–1200° C. (more preferably 900°–1170° C.).

The brazes applicable in the braze joint are set forth below:

| braze | brazing temperature(°C.) |
|---|---|
| pure Ag | 1000 |
| 80Ni-15Cr-5B | 1065–1205 |
| 89Ni-11P | 925–1095 |
| 70Ni-30Ti | 950–1200 |
| 72Ag-28Cu eutectic | 780–900 |
| 50Cu - 50Ti | 900–1050 |
| (composition by weight %) | |

In the following preferred embodiments of the present invention will be described in more detail with reference to the accompanying drawings.

DETAILED DESCRIPTION OF THE PREFERRED EMBODIMENTS

Example 1

Figure 1:
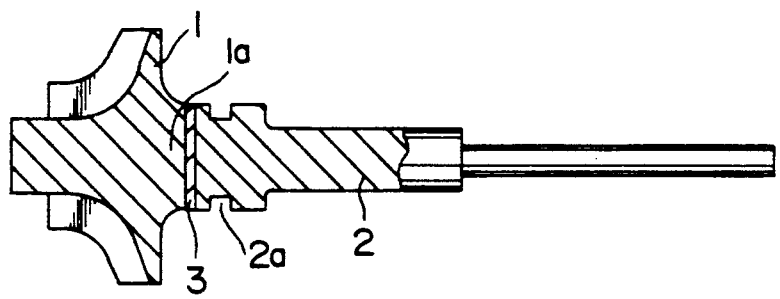
FIG. 1 is a cross-sectional view showing an embodiment of the heat-connected body according to the present invention, which is applied to a turbine rotor.

FIG. 1 is a cross-sectional view showing an example of the heat-connected body according to the present invention, which is designed to be applied to a turbine rotor. The reference numeral 1 denotes a blade wheel made of silicon nitride sintered body with a thermal expansion coefficient of $3.0 \times 10^{-6}$/° C. (R. T. to 1000° C.). The blade wheel 1 was formed with a blade wheel axle 1a projectingly provided on the rear surface of a hub portion integral with the blade wheel, in order to connect the blade wheel 1 to a metal shaft operatively connected with a compressor wheel (not shown). The numeral 2 denotes a metal shaft made of SUH-616 for operatively connecting the blade wheel 1 with the compressor wheel. A seal ring groove 2a was formed in the metal shaft 2 on the end portion thereof near the blade wheel. The numeral 3 denotes a brazing material Ni-Ti (70 Ni-30Ti by wt %) for connecting the blade wheel 1 and the metal shaft 2. The turbine rotor as described above was manufactured by heat-connecting the blade wheel 1 to the metal shaft 2 with the Ni-Ti brazing material 3 on the end surface of the blade wheel axle 1a of the blade wheel 1 at a temperature of 1020° C. in vacuum of $10^{-6}$ Torr and thereafter lowering the temperature to room temperature at a cooling rate of 60° C./min. The hardness of the metal shaft 2 was $H_{RC}=52$ after having been heat-connected to the blade wheel 1. Only the other end of the metal shaft 2 remote from the blade wheel 1 was heated to 600° C. with a burner to be tempered. After the metal shaft 2 had been threaded by a lathe, finished, and balanced in rotational moment, the shaft 2 was assembled in a turbo charger having a slide bearing portion made of Pb coated brass to receive the metal shaft 2 at the quench hardened portion thereof. The turbo charger was equipped on a test in line engine of 6 cylinders with a combustion chamber volume of 2000 cc. As a result of a durability test for 500 hours at 100,000 rpm, it was confirmed that the wear was 1 micrometer or less at the slide bearing portion. Further, the tensile strength of the connected portion between the blade wheel 1 and the metal shaft 2 was 20 kg/mm².

Example 2

Two turbine rotors were manufactured under the same conditions as in the first embodiment except that the material of the metal shafts 2 were SUH-600; the heat-connecting temperature was 1100° C. and 930° C., respectively; and the rate of temperature lowering after the heat-connection was 65° C./min. The measured hardness of the metal shaft 2 was $H_{RC}=50$ and 40, respectively. In the same manner as in Example 1, after having been assembled in a turbo charger, run-stop cycle tests of each 1000 times (running for 300 sec and stop for 300 sec) have been performed. However, it has been found no wear at the bearing portions of the metal shafts. Further, the tensile strength between the blade wheel 1 and the metal shaft 2 was 15 kg/mm$^2$ and 13.5 kg/mm$^2$, respectively, at the connected portion.

Example 3

Figure 2:
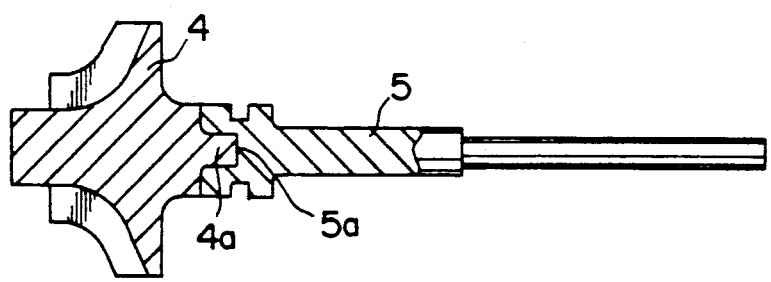
FIG. 2 is a cross-sectional view showing another embodiment of the present invention.
Figure 3A:
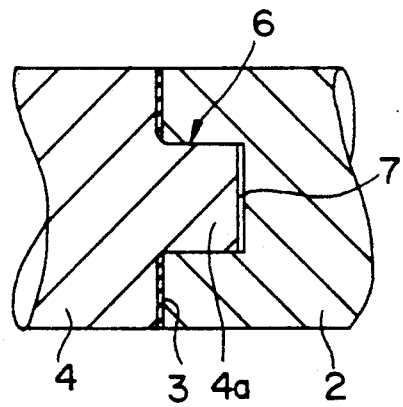
FIGS. 3A and 3B are cross-sectional views showing further embodiments of the present invention.
Figure 3B:
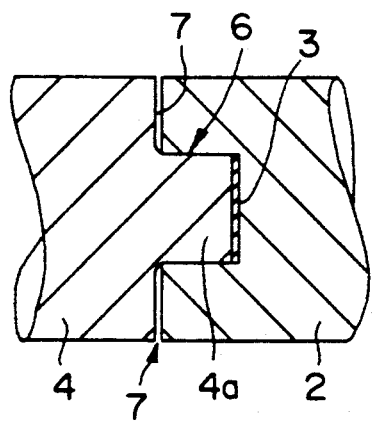

FIG. 2 is a cross-sectional view showing another embodiment of the heat-connected body according to the present invention, which is applied to a turbine rotor. The reference numeral 4 denotes a blade wheel made of silicon nitride sintered body with a thermal expansion coefficient of $3.0 \times 10^{-6}$° C. (as Example 1). The blade wheel 4 was formed with a blade wheel axle 1a projectingly provided on the rear surface of a hub portion integral with the blade wheel, in order to connect the blade wheel 4 to a metal shaft operatively connected with a compressor wheel (not shown). The numeral 5 denotes a metal shaft made of SUH-600. A recess 5a was formed in the end surface of the metal shaft 5 on the blade wheel side. The blade wheel axle 4a is connected to this recess by shrinkage fit. The turbine rotor as described above has been manufactured by heating the blade wheel 4 and the metal shaft 5 to 1100° C. and shrinkage-fitting the two with a fitting overlap dimension of 90 micrometer. The measured hardness of the metal shaft 5 was $H_{RC}=47$ after the heat-connection. In the same way as in the second Example, a run-stop cycle test was performed. However, no wear has been found at the slide bearing portion of the metal shaft.

What is claimed is:

1. A ceramic/metal composite turbine rotor assembly comprising a ceramic turbine rotor and a metal shaft which have been heat-connected to each other, wherein the ceramic turbine rotor has a coefficient of thermal expansion of about $8.0 \times 10^{-6}$/° C. or less and the metal shaft is martensite stainless steel or martensite heat-resistant steel having a Rockwell hardness HRC of at least 40 which has been quench hardened through martensite transformation in a gas or vacuum subsequent to heat-connecting at a temperature higher than the quench hardening temperature of the steel which is at least 800° C.

2. The turbine rotor assembly as set forth in claim 1, wherein said heat-connection is by brazing, shrinkage fit or both.

3. The turbine rotor assembly as set forth in claim 2, wherein the shrinkage fit comprises a connecting portion of the ceramic turbine rotor enclosed by a corresponding connecting portion of the metal shaft.

4. The turbine rotor assembly as set forth in claim 1, wherein said metal shaft has expanded at least 0.02% through the martensite transformation during cooling subsequent to the heat-connection.

5. The turbine rotor assembly as set forth in claim 1, wherein the heat-connection is butt-brazing.

6. The turbine rotor assembly as set forth in claim 1, wherein said metal shaft has expanded at least 0.1% through the martensite transformation during a course of cooling subsequent to the heat-connection.

7. The turbine rotor assembly as set forth in claim 1, wherein said metal shaft has a Rockwell hardness HRC of at least 45.

8. The turbine rotor assembly as set forth in claim 7, wherein said metal shaft has a Rockwell hardness HRC of at least 50.

9. The turbine rotor assembly as set forth in claim 1, wherein said ceramic turbine rotor has a coefficient of thermal expansion of nor more than about $4.6 \times 10^{-6}$/° C.

10. The turbine rotor assembly as set forth in claim 1, wherein said ceramic turbine rotor is one selected from the group consisting of sintered bodies of silicon nitride, silicon carbide, alumina and mixtures thereof.

* * * * *